Oct. 10, 1944.  W. F. SERR  2,359,881
CORING MACHINE
Filed July 8, 1941  3 Sheets-Sheet 1
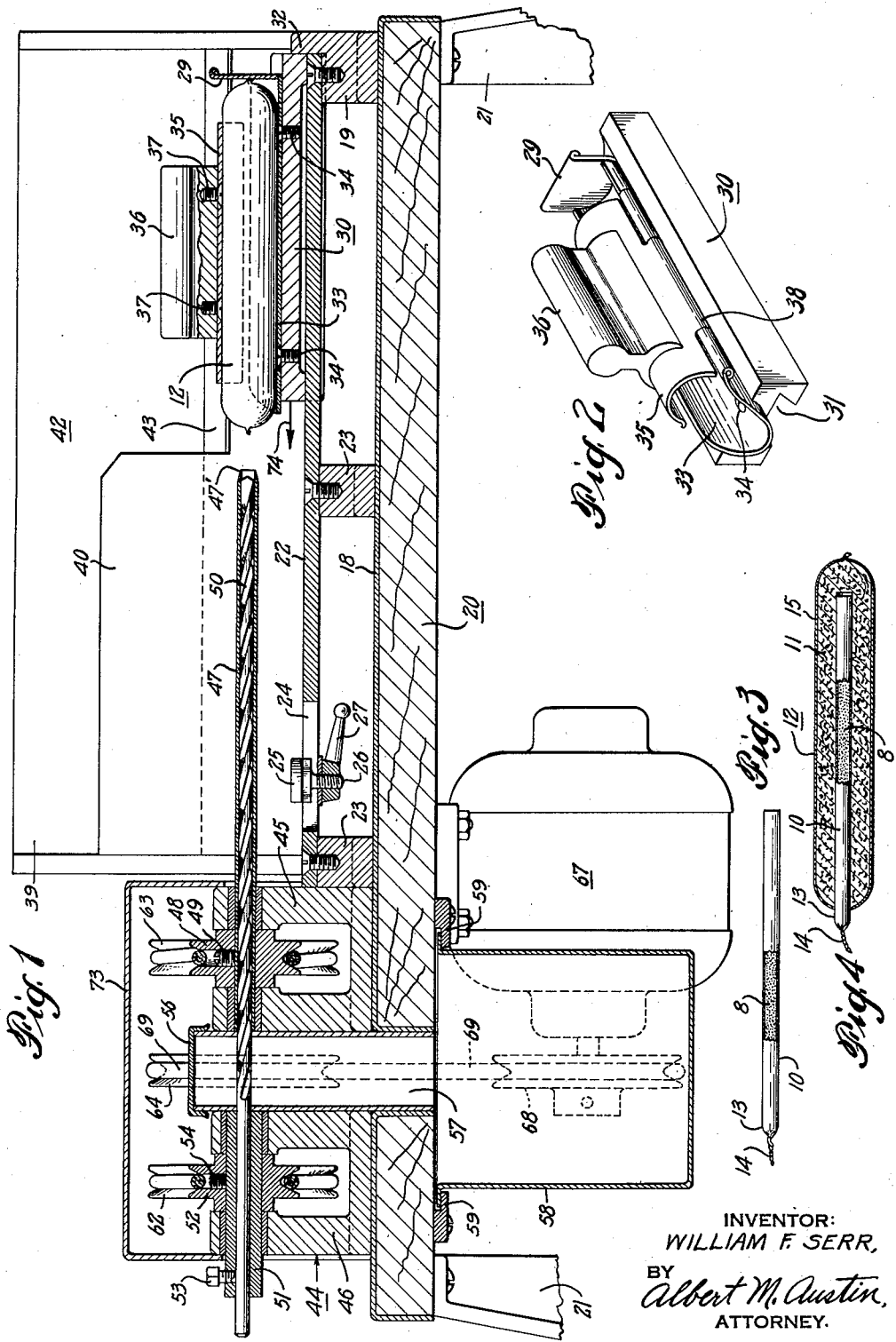
INVENTOR:
WILLIAM F. SERR,
BY Albert M. Austin,
ATTORNEY.

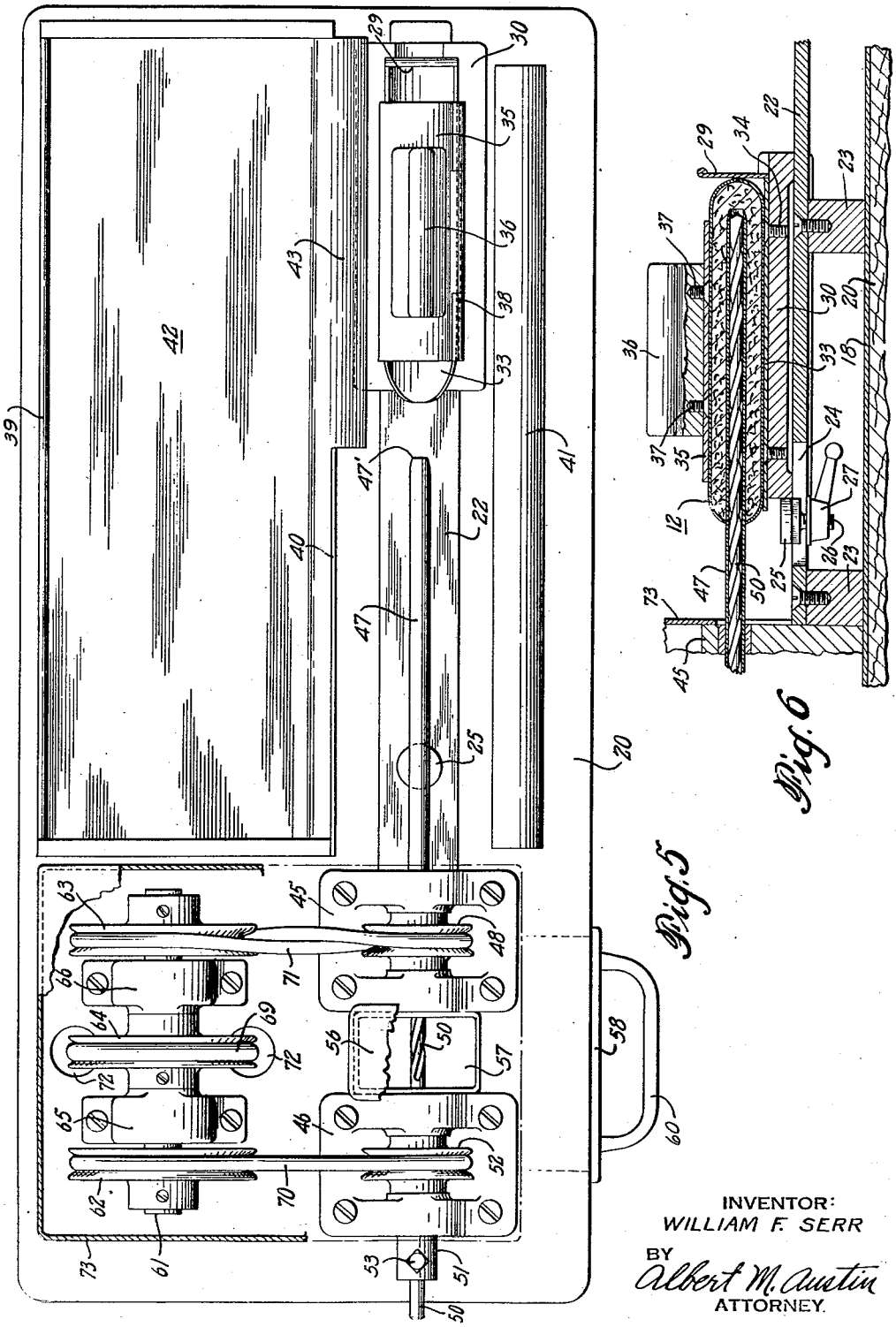

Oct. 10, 1944.  W. F. SERR  2,359,881
CORING MACHINE
Filed July 8, 1941  3 Sheets-Sheet 3
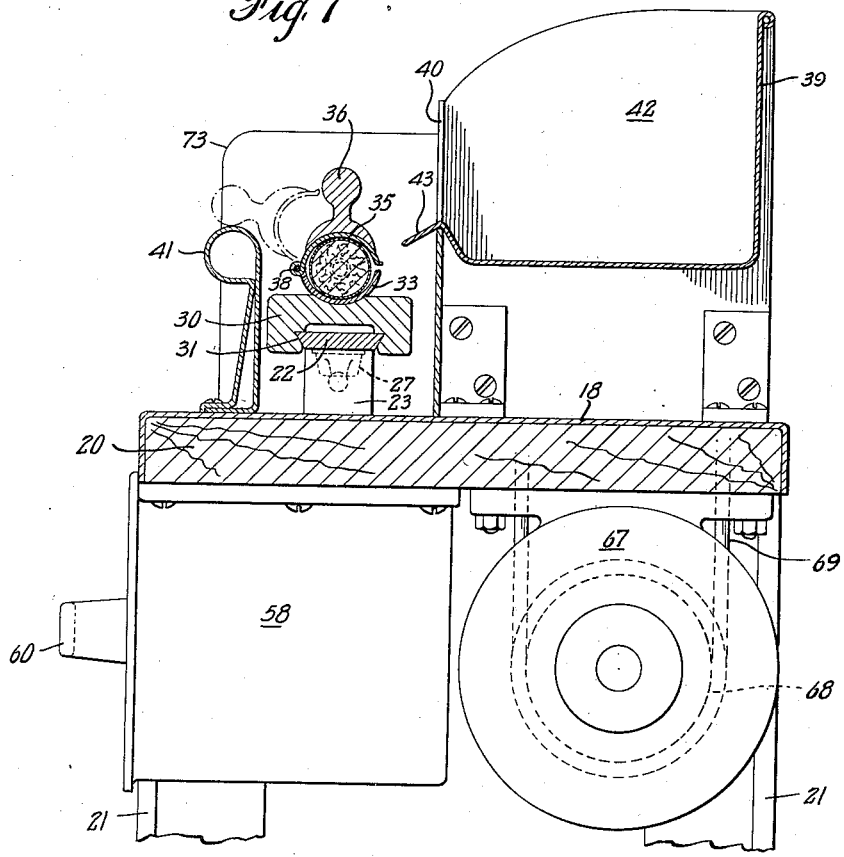
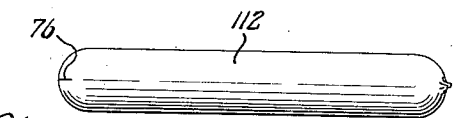
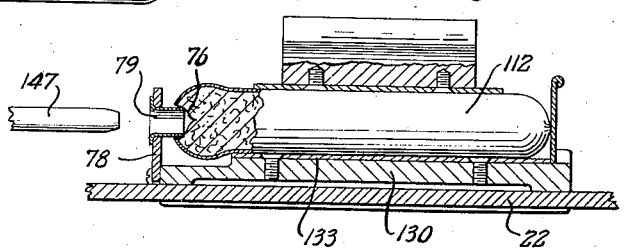
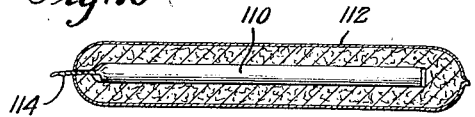
INVENTOR:
WILLIAM F. SERR
BY
Albert M. Austin
ATTORNEY Patented Oct. 10, 1944

2,359,881

UNITED STATES PATENT OFFICE 2,359,881

CORING MACHINE

William F. Serr, New York, N. Y., assignor to Yankfrank, Inc., New York, N. Y., a corporation of New York Application July 8, 1941, Serial No. 401,483

8 Claims. (Cl. 146—106)

The invention relates to coring machines and more particularly to machines suitable for making core holes in food products, such as described and claimed in my Patents No. 2,186,435, issued January 9, 1940, and No. 2,240,522, issued May 6, 1941.

These prior patents disclose specifically a meat product, such as frankfurters, having a longitudinal opening therein in which is disposed a casing holding a flavoring material such as mustard. One end of the inner casing protrudes from the frankfurter so that the user may remove the inner casing from the frankfurter.

According to a preferred form, the machine embodying the present invention has a cutting element comprising an outer cutting tube having a sharpened edge and a screw conveyor rotatable in opposite directions. Suitable pulleys or other driving devices are secured to said cutting tube and conveyor respectively, which devices may be mounted upon a suitable driving head or support mounted upon a base or table. The base or table may also have a longitudinal guideway on which is slidably mounted a carrier or holder for supporting the frankfurter or other food product, and upon which the food product is caused to move longitudinally of the cutting element to remove the core therefrom.

If desired, special provision may be made on the holder or carrier for removing a core from the frankfurter without appreciably mutilating the outside surface of the frankfurter. To this end the end of the frankfurter may be nicked by a sharp knife to provide a short slit which may be pried open to fit over a suitable hollow supporting member. The cutting element may then be caused to enter the frankfurter through this open slit and remove the core therefrom, after which the natural resilience of the frankfurter causes the slit to close without leaving any noticeable mark on the frankfurter.

After the core has been removed from the frankfurter, it will be understood that the inner casing filled with suitable flavoring material such as mustard will be inserted into the hole formed by removing the core. The inner casing may be of sufficiently stiff material to permit easy insertion thereof.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which Fig. 1 is a vertical section through the coring machine.

Fig. 2 is a perspective of the holder or carrier for the frankfurter or other food product.

Fig. 3 illustrates partly in section the inner casing filled with flavoring material preparatory to insertion in the food product.

Fig. 4 is a vertical section through frankfurter with the inner casing filled with flavoring inserted therein.

Fig. 5 is a plan view of the machine shown in Fig. 1.

Fig. 6 is a vertical section through a frankfurter showing the innermost position of the cutting element in the frankfurter.

Fig. 7 is a sectional view taken on a perpendicular, vertical, transverse plane through the holder in Fig. 1.

Fig. 8 illustrates a modified form of a frankfurter having its end slit preparatory to the insertion of the inner casing.

Fig. 9 illustrates a modified form of holder or carrier having a support for spreading a slit end of the frankfurter apart preparatory to the insertion of the cutting element.

Fig. 10 is a longitudinal section of a modified form of frankfurter after the inner casing has been inserted.

In the following description and in the claims, various details will be identified by specific names for convenience, but they are intended to be as generic in their appliction as the art will permit.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspect of the invention.

Referring now to the drawings and more particularly to Figs. 3 and 4, the frankfurter is indicated by 12 comprising the usual body 11 of meat hash having an outer skin or casing 15, which may be of animal intestine or the hardened skin-like surface of the so-called skinless frankfurter. Disposed within a core hole drilled longitudinally of the frankfurter is an inner casing 10 containing the flavoring material such as mustard indicated by 8. The inner end of the casing 10 is open the adjacent closed end of the frankfurter body 11 holding the flavoring material 8 in place. The outer end 13 of the casing 10 projects from the frankfurter and has a twisted portion indicated by 14 by which the inner casing 10 may be removed from the frankfurter preparatory to eating.

Referring now more particularly to Figs. 1, 2, 5, 6 and 7, the coring machine comprises a heavy base or table 20 supported by suitable legs 21. The base 20 may be made of suitable structural material such as wood protected by a non-corrodable covering such as stainless steel indicated by 18.

Mounted on the base is a guideway or track indicated by 22 and suitably supported by blocks indicated by 19 and 23. The guideway 22 has a slot 24 in which is adjustably positioned a stop member having a T-head 25, a screw portion 26 and a wing nut 27. Slidably mounted on the guideway 22 is the carrier 30 having a dovetail recess fitting corresponding surfaces on the guideway 22, as indicated more particularly in Fig. 7. The carrier 30 slides from the position shown in Fig. 1 where it abuts a shoulder 32 on block 19 to a position against the head 25 of the adjustable screw adjustably fixed in slot 24.

Secured to carrier 30 is a trough-shaped holder 33 having end wall 29 in which the frankfurter 12 is adapted to seat during the coring operation. Holder 33 is held in position by screws 34 and is provided with a curved cover 35 suitably hinged to holder 33 by hinge 38. A handle 36 is connected to cover 35 by screws 37. The cover 35 is adapted to close over the frankfurter 12 and the handle 36 is to assist in sliding the carrier 30 along the guideway 22 for the coring operation.

Resting upon the table 20 alongside the guideway 22 is a large bin 42 for holding the frankfurters to be cored. The bin 42 has a back wall 39 and a front wall 40, the latter being cut away to provide a lip 43 to assist in transferring the frankfurters from the bin to the carrier. A rest or wall 41 extends lengthwise of the guideway on the opposite side of the coring machine from the bin to protect against possible injury by accidental contact with the cutting element.

Mounted upon the table 20 is a head block 44 comprising bearing members 45 and 46, each bearing member having two sections between which pulleys 48 and 52 are journaled.

The cutting element comprises a cutter sleeve 47 having a sharpened edge 47' within which is disposed a screw conveyor 50. The cutting sleeve 47 is journaled in the sections of bearing 45 and has pulley 48 affixed thereto by set screw 49 which axially fixes the cutter sleeve.

The screw conveyor 50 has secured thereto an outer sleeve 51 which in turn supports pulley 52, these members being secured together by set screws 53 and 54.

Disposed between the two bearing members 45 and 46 is a vertical chute 57 having a removable top cover 56. The screw conveyor 50 passes through the walls of chute 57 in close relationship thereto. The chute 57 empties into a hash drawer 58 mounted on suitable slides 59 on the underside of the table 20. The drawer 58 is provided with a handle 60 by which the drawer may be pulled out and emptied of the meat hash whenever desired.

The pulleys 48 and 52 are driven through a counter-shaft 61 suitably journaled on the top of table 20 in bearings 65 and 66. The counter-shaft 61 supports pulleys 62, 63 and 64 suitably affixed thereto.

The counter-shaft 61 is driven by an electric motor 67 suitably bolted to the underside of table 20 and having a motor pulley 68. Belt 69 connects motor pulley 68 and intermediate pulley 64 passing through holes 72 in the table. Belt 70 connects pulleys 52 and 62 and belt 71 connects pulleys 48 and 63. It will be noted that belt 71 is crossed while belt 70 is open, this being for the purpose of rotating the cutting sleeve 47 and conveyor 50 in opposite directions. The drive pulleys and belts are covered and protected by a suitable cap or cover 73 having slots straddling cutting sleeve 47 and sleeve 51 and suitably secured in position.

In operation the adjustable bolt 25 will be set in slot 24 to correspond to the depth to which it is desired to drill the frankfurter 12, this position being illustrated in Fig. 6. The frankfurters to be cored will be placed one at a time in the holder 33 and the carrier 30 moved in the direction of the arrow 74 in Fig. 1 to cause the cutting elements 47 and 50 to remove the core of the meat hash from the frankfurter 12. It will be understood that the helical screw conveyor 50 will rotate in such direction as to cause the hash to be conveyed thereby through the helical groove thereof to the chute 57 whence it falls automatically into the hash drawer 58. The sharpened edge of the cutting tube on sleeve 47 cuts a neat clean hole in the frankfurter and the removal of the hash leaves a clean bore into which the inner flavor carrying casing may be easily inserted. When the hole is bored into the frankfurter the carrier 30 is withdrawn to the position shown in Fig. 1, the frankfurter 12 removed and a new frankfurter put in its place.

The inner casing 10 filled with flavoring 8 will then be inserted in the bore holes by hand operation, it being understood that the material of casing 10 may be sufficiently stiff to permit ready insertion thereof. The casing 10 is not too stiff to prevent forcible collapsing thereof when it is desired to remove the casing 10 from the frankfurter, squeezing the flavoring material 8 out of the casing 10 into direct contact with the meat of the frankfurter prior to eating as explained in the patents above-mentioned, particularly Patent No. 2,240,522.

Referring now to Figs. 8 to 10, if desired the frankfurter may be cored and the inner casing inserted in such way as to be less noticeable than in the form illustrated in Fig. 4. To this end a small knife cut indicated by 76 in Fig. 8 may be placed in the end of the frankfurter prior to placing the frankfurter in the holder indicated by 133. A support 78 may be secured to the carrier 130 supporting a sleeve or eye 79 which serves to hold open the sides of the slit 76 in frankfurter 112. The cutting element including the sleeve 147 then may pass through the eye 79 as the carrier 130 is moved to the left in Fig. 9 and, after the meat of the core is removed and the frankfurter 112 is removed from the holder 133, the sides of the slit 76 will spring back together, the frankfurter taking on an appearance not unlike its appearance before the coring operation as shown in Fig. 8.

To insert the inner casing 110 within the frankfurter 112 the slit 76 will be sprung open again and the casing 110 inserted. This casing may have a somewhat longer twisted or flattened end 114 so as to project out through the slit 76 when it springs back into position as shown in Fig. 10. It is thought that the use of this form of the invention will be apparent from the above description, so no further explanation will be given.

Thus a coring machine has been provided, which quickly and efficiently removes cores of meat from frankfurters. It produces a clean hole and the meat is efficiently removed and conveyed to a suitable storage container, whence it can be re-used or disposed of as conditions may dictate. The coring operation is simple. There is nothing to get out of order and the machine should give long and efficient service.

While certain novel features of the invention have been disclosed herein, and are pointed out in the annexed claims, it will be understood that various omissions, substitutions and changes may be made by those skilled in the art without departing from the spirit of the invention.

What I claim is:

1. In a coring machine for removing cores of material from frankfurters and the like, a cutting element comprising a cylindrical tube of a length sufficient to core the length of the frankfurter, said tube having a sharp end, a screw conveyor comprising a shank having a helical groove in its outer surface and disposed within and snugly fitting said tube, means for rotating said tube and screw conveyor in opposite directions, a carrier for the frankfurter, and means for moving said cutting element and said carrier relatively in the direction of the axis of said cutting element, said tube having a discharge opening remote from said sharp end through which said conveyor discharges the core material, said helical groove extending to said discharge opening.

2. In a coring machine for removing cores of material from comestibles and the like, a cutting element comprising a cylindrical tube having a sharp end, a screw conveyor disposed within and snugly fitting said tube, means for rotating said tube and screw conveyor in opposite directions, a carrier for the comestible, a support on said carrier for holding apart portions of the end of said comestible, and means for moving said cutting element and said carrier relatively in the direction of the axis of said cutting element, whereby a core may be removed from said comestible without removing any substantial part of the surface of said comestible.

3. In a coring machine for removing cores of material from frankfurters, a cutting element comprising a cylindrical tube of a length sufficient to core the length of the frankfurter, said tube having a sharp end, a conveyor disposed within said tube, means for rotating said tube and operating said conveyor in opposite directions, a carrier for the comestible, and means for moving said cutting element and said carrier relatively in the direction of the axis of said cutting element, said conveyor comprising a shank having a helical groove in its outer surface, said shank closely fitting the inner surface of said tube, said groove forming a conveying passage, said tube having an opening through which core material passing through said passage is discharged and to which opening said groove extends.

4. In a coring machine for removing cores of material from frankfurters, a cutting element comprising a cylindrical tube of a length sufficient to core the length of the frankfurter, said tube having a sharp end, a screw conveyor disposed within and closely fitting said tube, and means for rotating said tube and screw conveyor in opposite directions, said tube having a discharge opening remote from said sharp end through which said conveyor discharges the core material, the screw conveyor extending to said opening.

5. In a coring machine for placing bore holes in comestibles, a base having a longitudinal guideway, a carrier slidable on said guideway adapted to support the comestible to be cored, first and second bearings on said base, a cutting tube journaled in said first bearing, a pulley affixed to said tube, a screw conveyor journaled in said second bearing and disposed inside of said cutting tube, said cutting tube and conveyor entering said comestible when said carrier is fed on said guideway toward said tube and conveyor, a second pulley affixed to said screw conveyor, a chute between said bearings having walls through which said conveyor passes, said conveyor extending beyond said cutting tube to provide communication with said chute, a removable drawer slidably mounted on the underside of said base into which said chute empties, a counter-shaft, bearings supporting said counter-shaft on said base, pulleys on said counter-shaft, and belts connecting said last-mentioned pulleys with said first and second pulleys, a drive motor on said base and having a pulley, an additional pulley on said counter-shaft, and a third belt connecting said additional pulley and said motor pulley.

6. In a coring machine for placing bore holes in comestibles, a table having a longitudinal guideway, a carrier slidable on said guideway adapted to support the comestible to be cored, a head on said table comprising spaced first and second bearings each having spaced sections, a cutting tube journaled in said first bearing, a pulley affixed to said tube and located between the sections of said first bearing, a screw conveyor journaled in said second bearing and disposed inside of said cutting tube, said cutting tube and conveyor entering said comestible when said carrier is fed on said guideway toward said tube and conveyor, a second pulley affixed to said screw conveyor and disposed between the sections of said second bearing, a chute between said bearings having walls through which said conveyor passes, said conveyor extending beyond said cutting tube to provide communication with said chute, a removable drawer slidably mounted on the underside of said table into which said chute empties, a counter-shaft, bearings supporting said counter-shaft on the upper side of said table, pulleys on said counter-shaft, and belts connecting said last-mentioned pulleys with said first and second pulleys, a drive motor suspended from the underside of said table and having a pulley, an additional pulley on said counter-shaft, and a third belt connecting said additional pulley and said motor pulley.

7. In a coring machine for placing bore holes in comestibles, a cutting tube, a base having a longitudinal guideway, a carrier slidable on said guideway adapted to support the comestible to be cored for movement towards, and away from, said cutting tube, first and second bearings on said base, said cutting tube being journaled in said first bearing, a drive wheel affixed to said tube, a screw conveyor journaled in said second bearing and disposed inside of said cutting tube, a second drive wheel affixed to said screw conveyor, a conduit between said bearings having walls through which said conveyor passes, said cutting tube extending short of said conveyor to discharge core material into said conduit, means to receive material from said conduit, and means for driving said drive wheels.

8. In a coring machine for removing cores of material from comestibles and the like, a cutting element for removing the core; clamping means for holding the comestible; an orifice member associated with said clamping means for spreading apart a portion of the comestible to permit said cutting element to enter said comestible through the spread-apart portion of the comestible without removal of a substantial portion of the surface of the comestible; and means for mounting said clamping means and orifice member as one unit and said cutting element as another unit for relative movement towards, and away from, each other.

WILLIAM F. SERR.